(12) United States Patent
Blanchet et al.

(10) Patent No.: US 7,393,605 B2
(45) Date of Patent: *Jul. 1, 2008

(54) FUEL CELL END UNIT WITH INTEGRATED HEAT EXCHANGER

(75) Inventors: Scott Blanchet, Chelmsford, MA (US); Pinakin Patel, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/436,748

(22) Filed: May 18, 2006

(65) Prior Publication Data

US 2006/0204821 A1    Sep. 14, 2006

Related U.S. Application Data

(62) Division of application No. 10/329,182, filed on Dec. 24, 2002, now Pat. No. 7,070,874.

(51) Int. Cl.
    *H01M 8/02*      (2006.01)
    *H01M 8/24*      (2006.01)
    *H01M 8/04*      (2006.01)
(52) U.S. Cl. ............................... 429/26; 429/34; 429/38
(58) Field of Classification Search .................. 429/12, 429/26, 34, 38, 39; 165/176, 134.1, 145, 165/162
    See application file for complete search history.

(56) References Cited

U.S. PATENT DOCUMENTS 1,967,781 A    7/1934    Potter et al. .................. 257/239

(Continued)

FOREIGN PATENT DOCUMENTS

JP    60-105177    6/1985

(Continued)

OTHER PUBLICATIONS

Jan. 31, 2007 United States Patent and Treadmark Office Office Action issued in U.S. Appl. No. 10/916,235.

(Continued)

*Primary Examiner*—Gregg Cantelmo
(74) *Attorney, Agent, or Firm*—Cowan, Liebowitz & Latman, P.C.

(57) ABSTRACT

An end unit for a fuel cell stack having a plurality of fuel cell stacked in a first direction, the end unit for stacking in the first direction adjacent an end fuel cell in the fuel cell stack. The end unit separates a current collection post from the end cell of the fuel cell stack and comprises a first wall being adjacent the end cell when the end unit is stacked in the first direction in the fuel cell stack, a second wall opposing the first wall and adjacent the current collection post when the end unit is stacked in the first direction in the stack, a first side wall connecting the first and second walls, a second side wall transverse to the first side wall and connecting the first and second walls, a third side wall opposing the first side wall and connecting the first and second walls, a fourth side wall opposing the second side wall and connecting the first and second walls, with the first and second walls and the first, second, third and fourth side walls forming an enclosure, and a plurality of electrically conductive posts disposed within the enclosure and extending between the first and second walls for providing a structure which restricts electrical current flow from the first fuel cell stack to the current collection post when the end unit is stacked in the first direction in the fuel cell stack.

26 Claims, 6 Drawing Sheets

U.S. PATENT DOCUMENTS

| | | | |
|---|---|---|---|
| 3,101,930 A | 8/1963 | Huet | 165/143 |
| 3,278,336 A | 10/1966 | Uline et al. | |
| 4,225,654 A | 9/1980 | Tajima et al. | 429/35 |
| 4,719,157 A | 1/1988 | Tsutsumi et al. | 429/34 |
| 5,009,968 A | 4/1991 | Guthrie et al. | 429/26 |
| 5,212,022 A | 5/1993 | Takahashi et al. | |
| 5,324,565 A | 6/1994 | Leonida et al. | 428/131 |
| 5,856,034 A | 1/1999 | Huppmann et al. | 429/17 |
| 6,106,964 A | 8/2000 | Voss et al. | 429/20 |
| 6,110,612 A | 8/2000 | Walsh | 429/13 |
| 6,318,066 B1 | 11/2001 | Skowronski | 60/39.05 |
| 6,692,859 B2 | 2/2004 | Mukerjee et al. | |
| 6,875,535 B2 | 4/2005 | Ye et al. | |

FOREIGN PATENT DOCUMENTS

| | | |
|---|---|---|
| JP | 01-048381 | 2/1989 |
| JP | 014-089154 | 4/1989 |
| JP | 04-121969 | 4/1992 |
| JP | 07-006782 | 1/1995 |
| JP | 09-293528 | 11/1997 |

OTHER PUBLICATIONS

Original Claims 1-69 as submitted in U.S. Appl. No. 10/916,235.

FUEL CELL END UNIT WITH INTEGRATED HEAT EXCHANGER

CROSS-REFERENCE TO RELATED APPLICATIONS

This application is a divisional of application Ser. No. 10/329,182, filed Dec. 24, 2002, now U.S. Pat. No. 7,070,874, issued Jul. 4, 2006, the entire disclosure of which is hereby incorporated by reference.

BACKGROUND OF THE INVENTION

This invention relates to fuel cells and, in particular, to end plates and heat exchangers for fuel cell systems. More specifically, this invention relates to highly integrated, compact heat exchangers for use in superheating fuel gas for high temperature fuel cells.

A fuel cell is a device which directly converts chemical energy stored in a fuel such as hydrogen or methane into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional means in both increased efficiency and reduced pollutant emissions.

In general, a fuel cell, similar to a battery, includes a negative (anode) electrode and a positive (cathode) electrode separated by an electrolyte which serves to conduct electrically charged ions between them. In contrast to a battery, however, a fuel cell will continue to produce electric power as long as fuel and oxidant are supplied to the anode and cathode, respectively. To achieve this, gas flow fields are provided adjacent to the anode and cathode through which fuel and oxidant gas are supplied. In order to produce a useful power level, a number of individual fuel cells must be stacked in series with an electrically conductive separator plate between each cell.

In a conventional fuel cell stack for stationary power applications, the active area of the fuel cells is large, typically between ½ and 1 $m^2$. In order to apply a reasonable interface pressure on the cells, a large compressive load must be applied to the cells through the end plates. As the end plates must remain flat to insure intimate contact is maintained with the cells, the end plates are typically thick relative to their length and width. This thickness adds to the overall length of the fuel cell stack and size of the fuel cell power plant.

In addition, for high temperature fuel cell systems, a heat exchanger is required to heat the fuel gas to near the temperature of the stack prior to delivery to the stack. In one type of fuel cell system, this heat exchanger is placed external to the fuel cell stack as part of the balance of the plant. This requires additional space to accommodate the fairly thick insulation (2-3 inches) used to encase the heat exchanger. Also, in this type of system, process gas must be piped to and from the heat exchanger, adding to both the size and cost of the system.

As described in U.S. Pat. No. 5,856,034, insulation for the heat exchanger can be eliminated by placing the heat exchanger inside the already insulated fuel cell module enclosing the fuel cell stack. Specifically, the heat exchanger is placed upstream and adjacent the cathode inlet face of the stack, making it necessary to construct the exchanger large enough so as to completely cover the cathode inlet face. Also, in this system, due to the inherent non-uniform temperature distribution at the outlet of the heat exchanger, the stack inlet temperature distribution is also non-uniform. This condition is undesirable as non-uniform cathode inlet temperature not only creates a potential performance variation in the stack but also creates the risk of cell-to-cell wet seal leaks due to thermal expansion differences of the stack face.

U.S. Pat. No. 5,009,968 describes an end plate structure in which a thin membrane is used to maintain good electrical contact with the end cells of the fuel cell stack. The thin membrane structure is not specifically adapted to uniformly collect electrical current from the stack. U.S. Pat. No. 4,719,157 describes a thin end plate with multiple current collecting terminals used to inhibit deformation of the plate. Again, this arrangement is not specifically adapted to provide uniform collection of electrical current.

SUMMARY OF THE INVENTION

The present invention provides an end unit of a fuel cell stack having an assembly adapted to receive and convey gases in a heat exchange relationship, and/or to restrict electrical current flow from the fuel cell stack to a current collection post.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
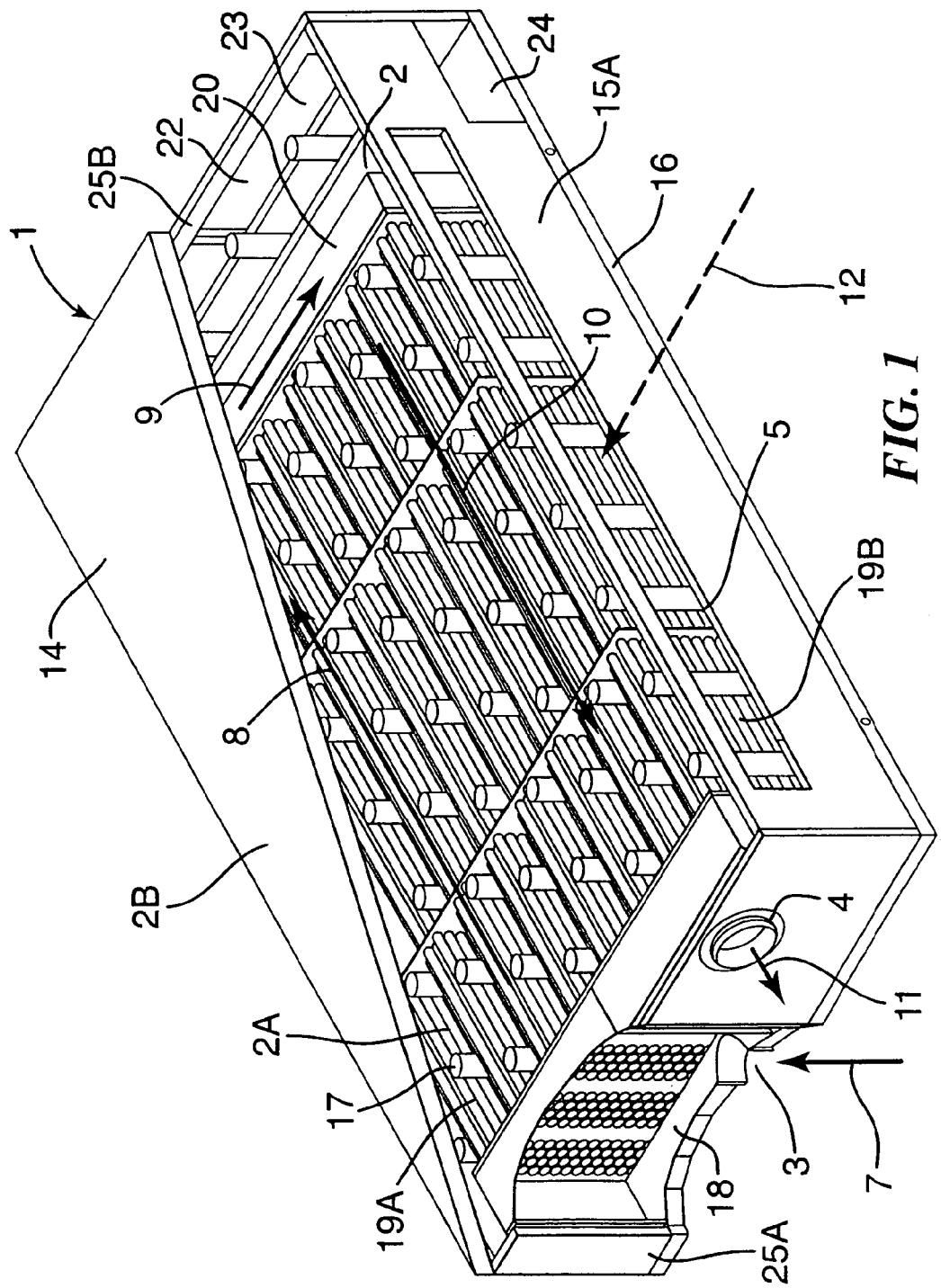
FIGS. 1 and 2 are isometric views of the end unit in accordance with the principles of the present invention.
Figure 2:
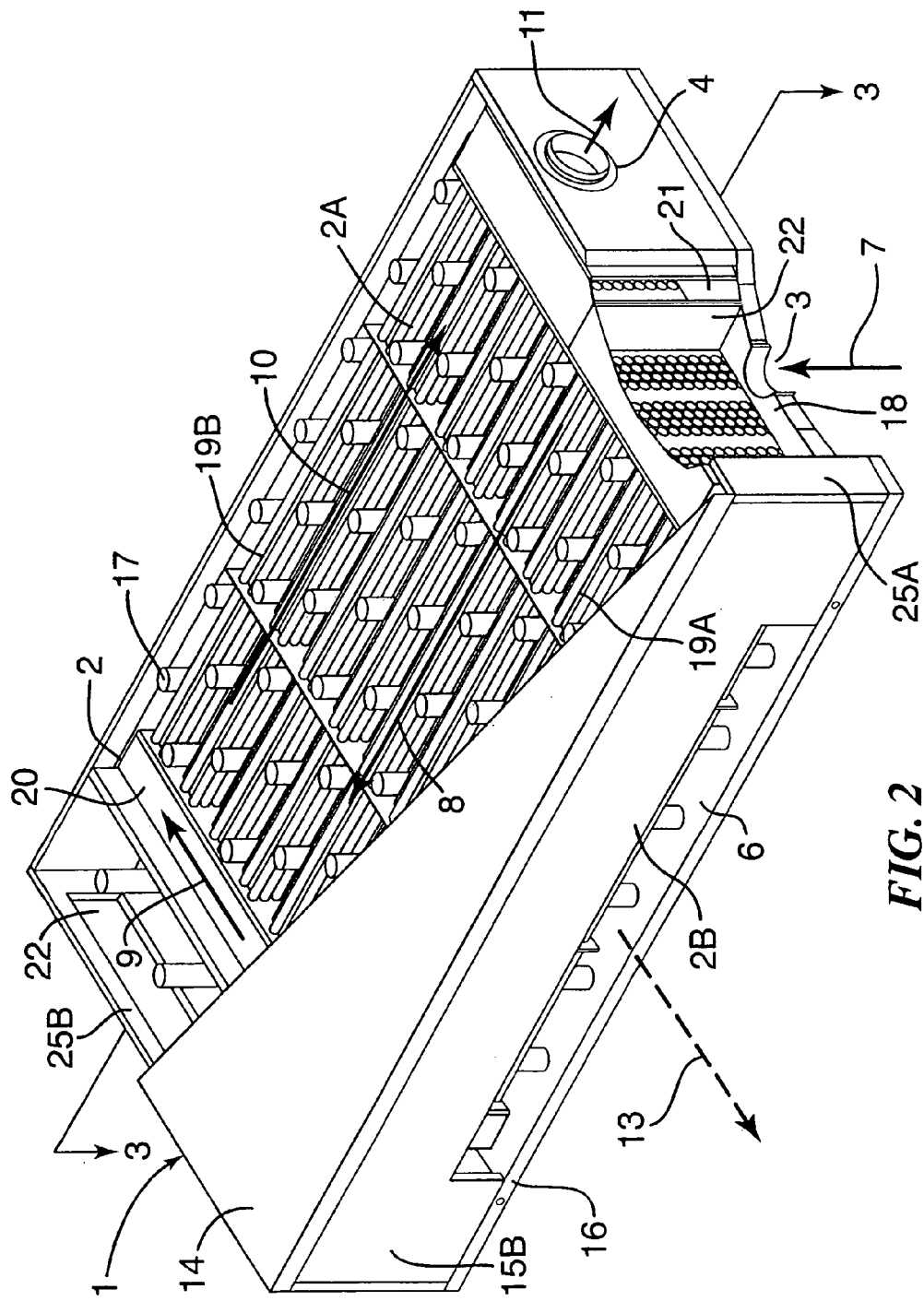
Figure 3:
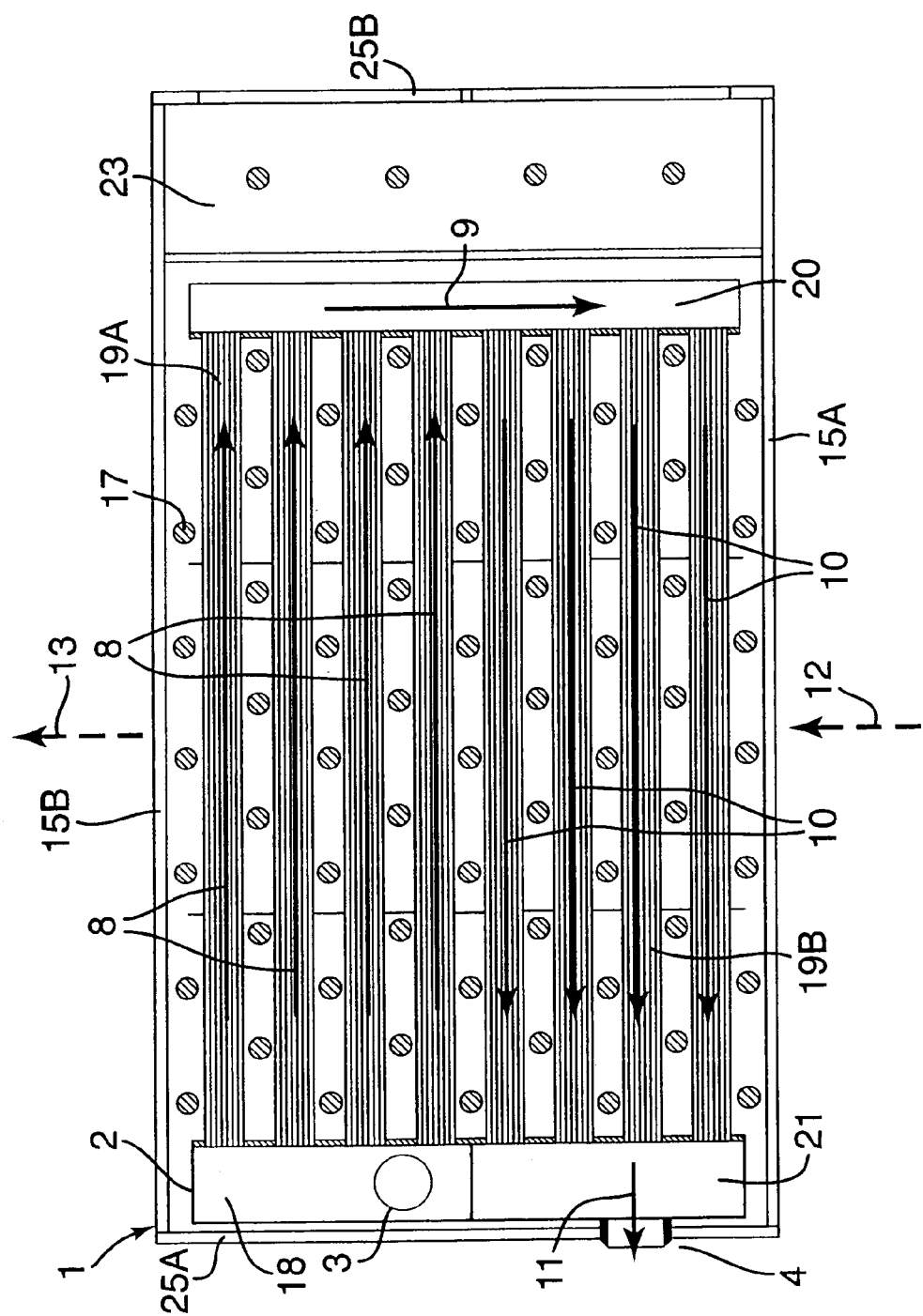
FIG. 3 is a cross-sectional top plan view of the end unit of FIG. 1 taken along the line 3-3 of FIG. 2.

Referring to FIGS. 1, 2 and 3, the illustrative embodiment of the invention has an end unit 1 adapted to be attached to one end of a fuel cell stack. The end unit 1 houses an assembly 2 including first and second units 2A, 2B associated with the flow of a first and second gas, respectively, through the assembly and which act together as a heat exchanger. In the case shown, the first and second gases are fuel cell stack anode or fuel inlet gas and fuel cell stack cathode exhaust gas, respectively.

Particularly, the first unit 2A has an inlet 3 through which fuel gas passes (depicted by arrow 7) into an inlet chamber 18. Fuel gas collects in inlet chamber 18, flows in a direction 8 through a first set of tubes 19A and is delivered to a turn plenum 20. Fuel gas flows in a direction 9 through the turn plenum 20 and from the plenum 20 flows in a direction 10 through the tubes 19B. The gas is delivered by tubes 19B to an outlet chamber 21 (shown in FIGS. 2 and 3). Fuel gas exits the outlet chamber 21 through an outlet pipe 4 in a direction indicated by arrow 11 and, as described in further detail below with respect to FIG. 6, flows through the fuel cell stack.

The second unit 2B forms an enclosure for the first unit 2A. In the illustrative embodiment, the second unit 2B has a first (or top) plate 14, opposing side walls 15A and 15B, front and back walls 25A and 25B, and second (or bottom) plate 16 so as to create a generally hollow box structure of the appropriate length and width to match the fuel cell stack and the appropriate depth so as to remain flat within a desired tolerance upon compressive loading of the stack. As shown in FIGS. 1 and 2, the first unit 2A is contained within the hollow interior of the second unit 2B. In addition, an inlet port 5 (shown in FIG. 1) and an outlet port 6 (shown in FIG. 2) are formed in opposing side walls 15A, 15B of the unit 2B. Also shown in the second unit 2B is a plurality of members 17 extending between the first plate 14 and second plate 16 to provide structural support for the second unit 2B. Members 17 will be described in further detail below with respect to the current collection characteristics of the end unit.

Fuel cell stack cathode gas enters the second unit 2B through inlet port 5 (depicted by arrow 12 in FIG. 1) and flows in a direction substantially transverse to the plurality of tubes 19A, 19B. As described above with respect to the first unit 2A, fuel gas flows along paths 8 and 10 in the first and second sets of the multitude of tubes 19A, 19B. Collectively, the tubes 19A, 19B have the required heat transfer surface area to adequately transfer heat from the hot cathode gas to the fuel gas, thereby raising the temperature of the fuel gas to the desired temperature for delivery to the stack. The cathode outlet gas exits the end plate through opening 6 (as shown by direction 13 in FIG. 2).

The tubes 19A, 19B of the first unit 2A are designed to be mechanically separated from the first (or top) plate 14 forming the end of the stack, second (bottom) plate 16 and side walls 15A, 15B of the second unit 2B. This configuration prevents both excessive stress on the joints of the unit 2A and thermal distortions from affecting the flatness of the top and bottom plates 14, 16 of the second unit 2B.

Also depicted in FIGS. 1, 2 and 3 is a separate chamber 23 in the second unit 2B adapted to collect the anode outlet gas from the fuel cell stack by way of an anode outlet manifold (not shown). Fuel cell stack anode outlet gas is delivered to the chamber 23 through an inlet opening 22 formed in a rear wall 25B of the second unit 2B and exits the chamber 23 through an outlet opening 24 formed in a side wall 15A. With the above configuration for the end unit, all gas connections (ducts, pipes and bellows) for delivering and removing process gases to and from the stack are made through the end unit 1 at one end of the stack.

Figure 4:
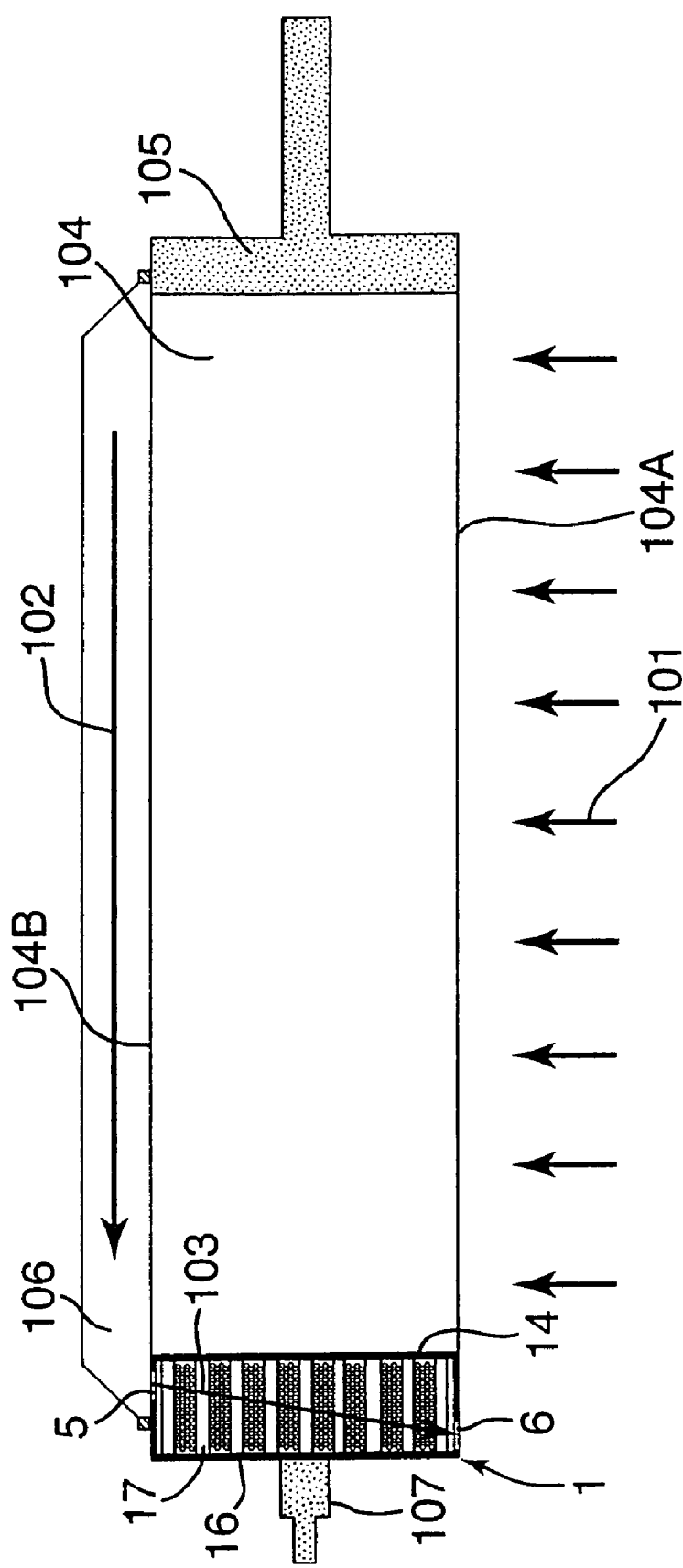
FIG. 4 is a front cross-sectional view of a fuel cell stack utilizing the end unit of FIG. 1.

The path of cathode gas flow through a fuel cell stack employing the end unit 1 of the invention is shown in the fuel cell stack cross-sectional view of FIG. 4. First, cathode inlet gas enters the fuel cell stack 104 along a first face 104A of the stack in a direction depicted by arrows 101. The cathode gas flows through the stack and exits the stack from a second stack face 104B opposite the first (cathode gas inlet) stack face 104A. Attached to the face 104B is a cathode outlet gas manifold 106. Cathode outlet or exhaust gas is collected in the cathode outlet gas manifold 106 and flows through the cathode outlet gas manifold 106 in a direction shown by arrow 102. The cathode outlet gas manifold 106 delivers cathode outlet gas to the end unit 1 through opening 5. Cathode outlet gas then flows through the end unit in a direction represented by arrow 103 and as described above with respect to FIGS. 1-3, and exits the end unit through opening 6. In this configuration, as previously stated, heat is transferred from the fuel cell stack cathode exhaust gas to the anode inlet gas by heat exchange in the end unit 1.

Figure 5:
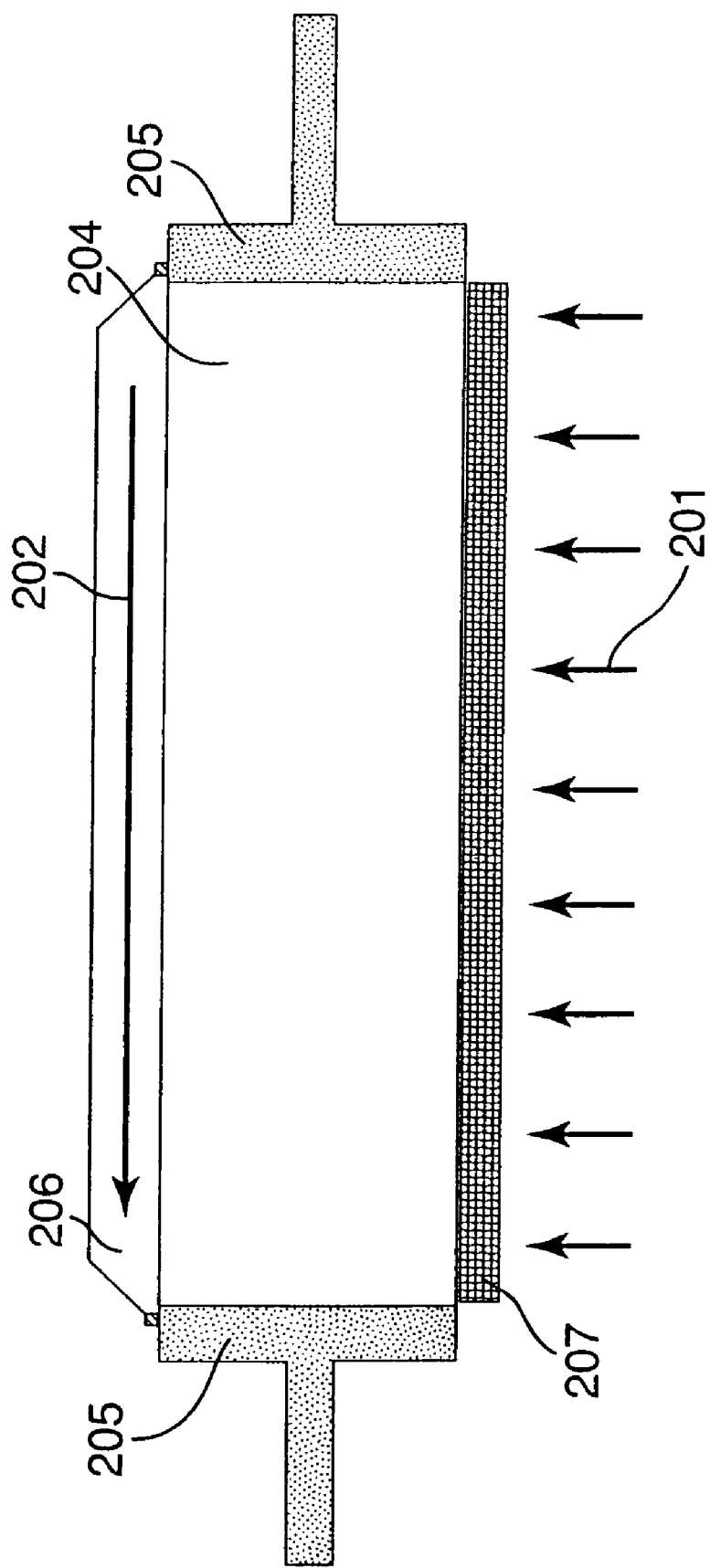
FIG. 5 is a cross-sectional side view of a conventional fuel cell stack.

In a conventional system, as shown in FIG. 5, heat is taken from an inlet stream (depicted by arrows 201) of fuel cell stack cathode gas, requiring an assembly 207 for heat exchange between cathode and anode gases to be disposed along an entire stack face. After flowing through the heat exchanger 207, cathode inlet gas flows through the stack 204 and exits the stack into a cathode outlet gas manifold 206. By providing heat exchange in the end unit attached to the end of a fuel cell stack in accord with the invention, rather than along an entire stack face as in the conventional structure of FIG. 5, large space requirements, non-uniformity in stack inlet temperature distribution and the risk of cell-to-cell wet seal leaks, as discussed above, are obviated.

Figure 6:
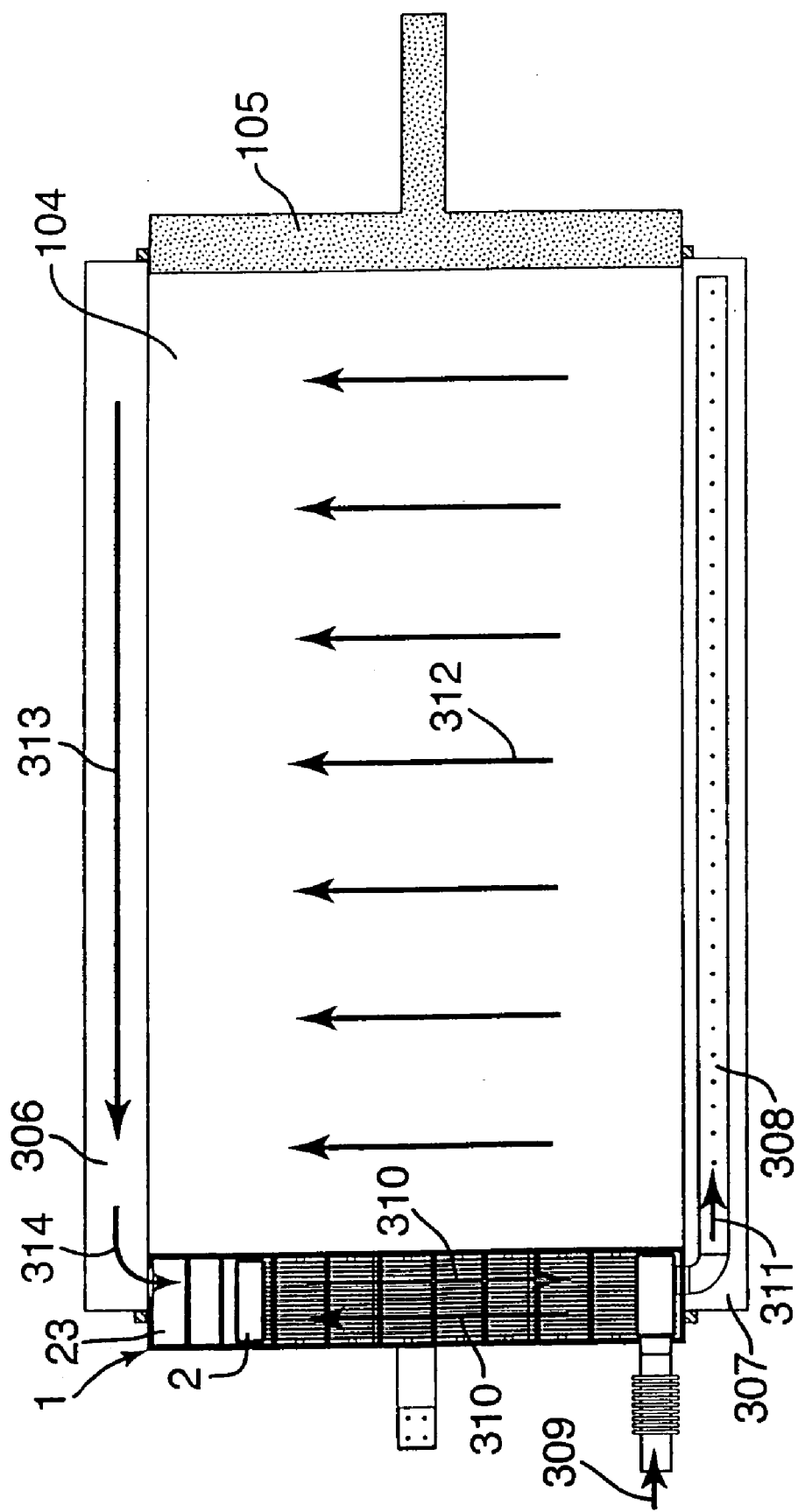
FIG. 6 is a side cross-sectional view of the fuel cell stack of FIG. 4.

FIG. 6 shows the path of anode or fuel gas flow through a fuel cell stack employing the end unit 1 of the invention. Fuel gas enters the end unit 1 at inlet 309, fills the inlet plenum 18 (not shown in FIG. 6) and flows through the tubes 19A, turn plenum 20 (not shown in FIG. 6), and tubes 19B in a substantially U-shaped path as depicted by arrows 310. As described above, anode gas is superheated by the transfer of heat from cathode outlet gas flowing transverse to the tubes 19A, 19B. Next, the heated anode gas exits the tubes 19B and flows from outlet plenum 21 (not shown in FIG. 6) of the end unit 1 into a fuel header 308 in a direction depicted by arrow 311. The fuel header 308 is disposed within a fuel gas inlet manifold 307 and extends along the length of the manifold 307. The fuel gas header 308 and manifold 307 permit the heated fuel gas to exit the header and manifold at points along the length of the manifold and flow into the fuel cell stack in a direction depicted by arrows 312. The flow of fuel gas through the fuel cell stack 104 as shown in FIG. 6 is in a direction 312 perpendicular to the direction of the flow of cathode gas through the fuel cell stack, but the anode and cathode gas flow paths do not intersect. After flowing through the stack 104, the fuel gas enters an anode outlet gas manifold 306 and flows in a direction depicted by arrow 313. The anode outlet gas manifold 306 then delivers the gas to the anode outlet gas chamber 23 of the end unit 1 as it flows in a direction shown by arrow 314. In the anode outlet gas chamber 23 of the end unit 1, the anode outlet stream is collected by the necessary ductwork and piping to be delivered to the balance of the fuel cell power plant.

With the end unit 1 of the invention, any fuel gas leaks that may develop over the life of the unit are immediately swept away from the stack by the cathode outlet gas. This is unlike the case of a heat exchanger placed upstream of the stack, in which a leak must first pass through the stack and cathode outlet manifold before leaving the fuel cell module. The risk of a build-up of the mixture of gases within the fuel cell module is reduced.

Turning back to FIG. 4, current collection posts 105, 107 are disposed at the positive and negative ends of the fuel cell stack. The current collection post 107 at the positive end of the stack is spaced from the first plate 14 by a plurality of members 17 (also shown in FIGS. 1-3). In the case shown, the members 17 are formed from electrically conductive material and are shaped as cylindrical columns. As shown in detail in FIGS. 1-3, the members 17 extend between the first plate 14 and second plate 16 and are disposed at uniformly spaced intervals among the first and second sets of said tubes 19A, 19B and in the anode outlet gas chamber 23. In the illustrative embodiment, the first plate 14 of the end unit 1 is in electrical contact with the stack, and the second plate 16 (see FIG. 1) is in electrical contact with the current collection post 107. The members 17 thus provide an electrical connection between the first and second plates 14, 16 of the end unit and additionally provide structural support to the end unit, distributing mechanical and thermal stresses in the end unit that develop during operation of the stack.

FIG. 5 shows a cross-sectional side view of a conventional fuel cell stack. As shown in FIG. 5, current collection posts 205 at each end of the stack are disposed adjacent to the positive and negative ends of the stack and collect current directly from the stack. In the present invention shown in FIG.

4, the separation of the current collection post 107 from the first plate 14 of the end unit 1 by the plurality of members 17 is advantageous in that the members 17 act to restrict electrical current flow slightly, allowing more uniform current collection from the stack through the uniformly spaced members 17.

In all cases it is understood that the above-described apparatus, method and arrangements are merely illustrative of the many possible specific embodiments that represent applications of the present invention. Numerous and varied other arrangements can be readily devised in accordance with the principles of the present invention without departing from the spirit and the scope of the invention. For example, while shown in FIG. 4 at the positive end of the stack, the end unit may be disposed at either the positive or negative ends of the fuel cell stack. Also, designs using a plate fin, compact heat exchanger, could also be configured.

What is claimed is:

1. A fuel cell stack end unit for a fuel cell stack having a plurality of fuel cells stacked in a first direction and an external manifold disposed externally of said fuel cell stack and adjacent a first face of said fuel cell stack for receiving a fuel cell stack outlet gas of said fuel cell stack, said fuel cell stack end unit for stacking in said first direction adjacent an end fuel cell in said fuel cell stack, said fuel cell stack end unit comprising:
an assembly having: a first wall being adjacent said end cell when said fuel cell stack end unit is stacked in said first direction in said fuel cell stack; a second wall opposing said first wall; a first side wall connecting said first and second walls and being on the side of said first face of said fuel cell stack when said end unit is stacked in said first direction in said fuel cell stack; an inlet port situated in said first side wall so as to be encompassed by said external manifold when said fuel cell stack end unit is stacked in said first direction in said fuel cell stack, said inlet port receiving the fuel cell stack outlet gas from said external manifold when said fuel cell outlet gas is in said external manifold for passage into said assembly; and an outlet port for conveying the fuel cell stack outlet gas when in said assembly from said assembly.

2. A fuel cell stack end unit in accordance with claim 1, wherein said assembly further comprises a second side wall connecting said first and second walls, said second side wall having said outlet port.

3. A fuel cell stack end unit in accordance with claim 2, wherein said second side wall is one of: opposite to said first side wall; and transverse to said first side wall.

4. A fuel cell stack end unit in accordance with claim 2, wherein: said fuel cell stack outlet gas is one of: fuel cell stack anode outlet gas; and fuel cell stack cathode outlet gas.

5. A fuel cell stack end unit in accordance with claim 4, wherein: said second side wall is opposite said first side wall; and said fuel cell stack outlet gas is fuel cell stack cathode outlet gas.

6. A fuel cell stack end unit in accordance with claim 5, wherein: said assembly further comprises: third and fourth opposing side walls connecting said first and second walls and transverse to said first and second side walls; said first and second walls and said first, second, third and fourth side walls forming a hollow enclosure.

7. An end unit according to claim 6, further comprising: a further inlet port in said third side wall for receiving an anode inlet gas of said fuel cell stack when said end unit is stacked in said stack.

8. An end unit according to claim 7, wherein said end unit further comprises: further outlet port in said third side wall for outputting said anode inlet gas in said assembly.

9. An end unit according to claim 8, further comprising an interior wall extending between said first and second walls and said first and second side walls, said interior wall being spaced from said fourth side wall and forming with said first and second walls and said first and second side walls a chamber; an additional inlet port in said fourth side wall for receiving in said chamber an anode outlet gas of said fuel cell stack when said end unit is stacked in said stack; and an additional outlet port in said first side wall for outputting said an anode outlet gas after passage through said chamber.

10. A fuel cell stack end unit in accordance with claim 4, wherein: said second side wall is transverse to said first side wall; and said fuel cell stack outlet gas is fuel cell stack anode outlet gas.

11. A fuel cell stack end unit in accordance with claim 10, wherein: said assembly further comprises: third and fourth side walls connecting said first and second walls and opposing said first and second side walls, respectively; said first and second walls and said first, second, third and fourth side walls forming a hollow enclosure.

12. A fuel cell stack end unit in accordance with claim 11, wherein: said assembly further comprises a further inlet port adapted to receive fuel cell stack anode inlet gas for passage through said assembly; and a further outlet port adapted to convey fuel cell stack anode inlet gas when in said assembly from said assembly.

13. A fuel cell stack structure comprising:
a plurality of fuel cells stacked in a first direction to form a fuel cell stack;
an external manifold disposed externally of said fuel cell stack and adjacent a first face of said fuel cell stack adapted to receive a fuel cell stack outlet gas;
a fuel cell stack end unit stacked in said first direction adjacent an end cell in said fuel cell stack, said fuel cell stack end unit comprising:
an assembly having: a first wall adjacent said end cell; a second wall opposing said first wall; a first side wall connecting said first and second walls and being on the side of said first face of said fuel cell stack; an inlet port situated in said first side wall so as to be encompassed by said external manifold, said inlet port receiving fuel cell stack outlet gas from said external manifold when said fuel cell outlet gas is in said external manifold for passage into said assembly; and an outlet port adapted to convey fuel cell stack outlet gas when in said assembly from said assembly.

14. A fuel cell stack structure in accordance with claim 13, wherein: said assembly further comprises a second side wall connecting said first and second walls, said second side wall having said outlet port.

15. A fuel cell stack structure in accordance with claim 14, wherein said second side wall is one of: opposite to said first side wall; and transverse to said first side wall.

16. A fuel cell stack structure in accordance with claim 15, wherein: said external manifold is one of: an anode outlet gas external manifold adapted to receive fuel cell stack anode outlet gas from said fuel cell stack; and a cathode outlet gas external manifold adapted to receive fuel cell stack cathode outlet gas from said fuel cell stack.

17. A fuel cell stack structure in accordance with claim 16, wherein: said second side wall is opposite said first side wall; and said external manifold is a cathode outlet gas external manifold adapted to receive fuel cell stack cathode outlet gas from said fuel cell stack.

18. A fuel cell stack structure in accordance with claim 17, wherein: said assembly further comprises: third and fourth opposing side walls connecting said first and second walls and transverse to said first and second side walls; said first and second walls and said first, second, third and fourth side walls forming a hollow structure.

19. A fuel cell stack structure in accordance with claim 18 wherein said assembly further comprises: a further inlet port in said third side wall for receiving an anode inlet gas of said fuel cell stack.

20. A fuel cell stack structure in accordance with claim 19 wherein said assembly further comprises: a further outlet port in said third side wall for outputting said anode inlet gas in said assembly.

21. A fuel cell stack structure in accordance with claim 20 wherein:
said assembly further comprises: an interior wall extending between said first and second walls and said first and second side walls, said interior wall being spaced from said fourth side wall and forming with said first and second walls and said first and second side walls a chamber; an additional inlet port in said fourth side wall for receiving in said chamber an anode outlet gas of said fuel cell stack; and an additional outlet port in said first side wall for outputting said an anode outlet gas after passage through said chamber.

22. A fuel cell stack structure in accordance with claim 21 further comprising:
a further external manifold disposed externally of said fuel cell stack and adjacent a further face of said fuel cell stack on the side of said third side wall, said further external manifold encompassing said further outlet port in said third side wall and receiving the anode inlet gas being output by said further outlet port; and
an additional external manifold disposed externally of said fuel cell stack and adjacent an additional face of said fuel cell stack on the side of said fourth side wall, said additional external manifold encompassing said additional inlet port in said fourth sidewall and conveying anode outlet gas to said additional inlet port.

23. A fuel cell stack structure in accordance with claim 16, wherein: said second side wall is transverse to said first side wall; and said external manifold is an anode outlet gas external manifold adapted to receive fuel cell stack anode outlet gas from said fuel cell stack.

24. A fuel cell stack structure in accordance with claim 23, wherein: said assembly further comprises: third and fourth opposing side walls connecting said first and second walls and transverse to said first and second side walls; said first and second walls and said first, second, third and fourth side walls forming a hollow enclosure.

25. A fuel cell stack structure in accordance with claim 24, wherein: said assembly further comprises a further inlet port adapted to receive fuel cell stack anode inlet gas for passage through said assembly; and a further outlet port adapted to convey fuel cell stack anode inlet gas when in said assembly from said assembly.

26. A fuel cell stack structure in accordance with claim 25 further comprising:
a further external manifold disposed externally of said fuel cell stack and encompassing said further outlet port for receiving the anode inlet gas being output by said further outlet port.

* * * * *